US009723138B2

(12) United States Patent
Zhao

(10) Patent No.: US 9,723,138 B2
(45) Date of Patent: *Aug. 1, 2017

(54) SYSTEM AND METHOD FOR IMPLEMENTING MULTIMEDIA CALLING LINE IDENTIFICATION PRESENTATION SERVICE

(71) Applicant: INVT SPE LLC, San Francisco, CA (US)

(72) Inventor: Junxian Zhao, Shenzhen (CN)

(73) Assignee: INVT SPE LLC, San Francisco, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/507,309

(22) Filed: Oct. 6, 2014

(65) Prior Publication Data

US 2015/0024723 A1    Jan. 22, 2015

Related U.S. Application Data

(63) Continuation of application No. 11/698,891, filed on Jan. 29, 2007, now Pat. No. 8,855,272.

(30) Foreign Application Priority Data

Feb. 24, 2006   (CN) .......................... 2006 1 0057699

(51) Int. Cl.
 *H04M 3/42* (2006.01)
 *H04L 29/06* (2006.01)
 *H04L 29/08* (2006.01)

(52) U.S. Cl.
 CPC ........ *H04M 3/42017* (2013.01); *H04L 29/06* (2013.01); *H04L 65/1006* (2013.01);
(Continued)

(58) Field of Classification Search
 CPC ..... H04W 4/18; H04W 68/005; H04W 76/02; H04W 76/022; H04L 65/1069;
(Continued)

(56) References Cited

U.S. PATENT DOCUMENTS

| 6,542,489 B1 | 4/2003 | Kari et al. |
| 2004/0032946 A1 | 2/2004 | Koser et al. |

(Continued)

FOREIGN PATENT DOCUMENTS

| CN | 1520211 A | 11/2004 |
| JP | 2002165013 | 7/2002 |
| KR | 20040093836 A | 11/2004 |

OTHER PUBLICATIONS

"3rd Generation Partnership Project; Technical Specification Group Services and System Aspects; IP Multimedia Subsystem (IMS); Stage 2 (Release y)," 3GPP TS 23.228 v7.2.0 (Dec. 2005).

(Continued)

*Primary Examiner* — Melanie Jagannathan
*Assistant Examiner* — Najeebuddin Ansari
(74) *Attorney, Agent, or Firm* — Daylight Law, P.C.

(57) ABSTRACT

From one perspective, an apparatus receives a request for a calling terminal device to initiate a session with a called terminal device. Based on the request, the apparatus obtains a storage address of the multimedia resource, and sends the address to the called terminal device. Based on sending the address the apparatus receives, from the called terminal device, a message indicating the called terminal device is playing the multimedia resource, and a message indicating that the called terminal device is off-hook. The called terminal device stops playing the multimedia resource when off-hook. From another perspective, a terminal device receives a storage address of a multimedia resource from a service management entity. The terminal device downloads (Continued)

the multimedia resource from a resource storage entity, and plays the multimedia resource as part of ringing, and before detecting that it is off-hook. The terminal device ceases playback after detecting it is off-hook.

19 Claims, 6 Drawing Sheets

(52) U.S. Cl.
CPC ...... *H04L 65/1069* (2013.01); *H04L 65/1083* (2013.01); *H04L 65/1096* (2013.01); *H04L 65/4007* (2013.01); *H04L 65/60* (2013.01); *H04L 67/141* (2013.01); *H04M 3/42042* (2013.01); *H04L 29/06027* (2013.01); *H04L 65/1016* (2013.01)

(58) Field of Classification Search
CPC ... H04L 65/1006; H04L 51/046; H04L 51/10; H04L 65/1089; H04L 67/125; H04L 67/26; H04L 67/306; H04M 3/42051; H04M 3/4365; H04M 15/8351; H04M 3/42059; H04M 7/00
USPC ..... 455/414.1, 415; 379/88.13, 88.19, 88.21, 379/88.23, 88.24, 375.01, 418, 419
See application file for complete search history.

(56) References Cited

U.S. PATENT DOCUMENTS

| | | | |
|---|---|---|---|
| 2004/0109550 A1* | 6/2004 | Latter ............... | H04M 1/57 379/142.01 |
| 2004/0109558 A1* | 6/2004 | Koch ............... | H04M 19/041 379/373.01 |
| 2005/0175161 A1* | 8/2005 | Reynolds ........... | H04M 19/041 379/88.17 |
| 2005/0207556 A1* | 9/2005 | Gonzalez ........... | H04M 3/02 379/207.16 |
| 2005/0226174 A1 | 10/2005 | Kiss | |
| 2006/0023862 A1 | 2/2006 | Sutcliffe | |
| 2006/0029202 A1* | 2/2006 | Koskela ............. | H04M 3/04 379/142.01 |
| 2006/0104434 A1* | 5/2006 | Nguyen ............. | H04M 19/041 379/373.01 |
| 2006/0153355 A1* | 7/2006 | Wang ............... | H04M 3/42017 379/215.01 |
| 2006/0165059 A1 | 7/2006 | Batni et al. | |
| 2006/0177044 A1* | 8/2006 | O'Neil ............... | H04M 3/02 379/373.02 |
| 2006/0199570 A1 | 9/2006 | Vendrow | |
| 2006/0215827 A1* | 9/2006 | Pfleging ............ | H04M 3/02 379/142.02 |
| 2006/0215829 A1 | 9/2006 | Schwartz | |
| 2006/0291639 A1 | 12/2006 | Radziewicz et al. | |
| 2007/0064921 A1 | 3/2007 | Albukerk et al. | |
| 2007/0116253 A1 | 5/2007 | Batni et al. | |
| 2007/0161412 A1 | 7/2007 | Nevid et al. | |
| 2007/0189474 A1 | 8/2007 | Cai | |

OTHER PUBLICATIONS

"3rd Generation Partnership Project; Technical Specification Group Core Network and Terminals; Signalling Flows for the IP Multimedia Call Control Based on Session Initiation Protocol (SIP) and Session Description Protocol (SDP); Stage 3 (Release 5)," 3GPP TS 24.228 v5.14.0 (Dec. 2005).

Rosenberg, et al., "SIP: Session Initiation Protocol", RFC 3261, Jun. 2002.

Camarillo, "The Early Session Disposition Type for the Session Initiation Protocol (SIP)," RFC 3959, Dec. 2004.

Foreign Communication from a counterpart application, PCT application PCT/CN2006/002933, English Translation of International Preliminary Report on Patentability dated Feb. 22, 2007, 4 pages.

Foreign Communication from a counterpart application, Chinese application 200680011755.5, Office Action dated Apr. 13, 2010, 49 pages.

Foreign Communication from a counterpart application, Chinese application 200680011755.5, Partial English Translation Office Action dated Apr. 13, 2010, 11 pages.

Office Action dated Mar. 25, 2011 cited in U.S. Appl. No. 11/698,891.

Office Action dated Oct. 5, 2011 cited in U.S. Appl. No. 11/698,891.

Notice of Allowance dated Jun. 6, 2014 cited in U.S. Appl. No. 11/698,891.

* cited by examiner

SYSTEM AND METHOD FOR IMPLEMENTING MULTIMEDIA CALLING LINE IDENTIFICATION PRESENTATION SERVICE

CROSS-REFERENCE TO RELATED APPLICATIONS

This application is a continuation of U.S. patent application Ser. No. 11/698,891, filed Jan. 29, 2007, and entitled "SYSTEM AND METHOD FOR IMPLEMENTING MULTIMEDIA CALLING LINE IDENTIFICATION PRESENTATION SERVICE," which application claims the priority of Chinese Patent Application No. 200610057699.0, filed Feb. 24, 2006. The entire contents of each of the foregoing applications are incorporated by reference herein in their entirety.

FIELD OF THE INVENTION

The present invention relates to the system and method for implementing a Multimedia Calling Line Identification Presentation (CLIP) service, more particularly to a system and method for implementing the CLIP service in an Internet Protocol Multimedia Subsystem (IMS).

BACKGROUND OF THE INVENTION

At present, with the continuous development of telecommunication technology, users have increasing demands for the telecommunication service, and a number of personalized telecommunication services have come forth thereby. However, there is no such service that allows a calling terminal to subscribe to multimedia resources used as a ringing prompt for a called terminal. For the convenience of description, such service is called a CLIP service for short hereinafter, and the multimedia resources that are subscribed by the calling terminal and used as a ringing prompt to play for the called terminal may include at least one of image, text, audio and video.

SUMMARY OF THE INVENTION

Embodiments of the present invention provide a system and a method for implementing a Multimedia Calling Line Identification Presentation (CLIP) service, which enables a calling terminal to subscribe to multimedia resources for a called terminal.

Embodiments of the present invention also provide an Application Server (AS) for implementing management for the CLIP service; a user terminal as a called terminal of the CLIP service so as to play the multimedia resources subscribed by the calling terminal for the called terminal; and a Multimedia Resource Function (MRF) for playing, for the called terminal, the multimedia resources subscribed by the calling terminal in the CLIP service.

A system for implementing a CLIP service includes:
a resource storage entity, for storing multimedia resources subscribed by a calling terminal;
a resource playing entity, for downloading the multimedia resources from the resource storage entity and playing the multimedia resources;
a CLIP service management entity, for obtaining a storage address of the multimedia resources and sending the storage address of the multimedia resources to the resource playing entity.

A method for implementing a CLIP service includes:
storing multimedia resources subscribed by a calling terminal in a resource storage entity;
obtaining, by a CLIP service management entity, a storage address of the multimedia resources, and sending the storage address of the multimedia resources to a resource playing entity;
downloading, by the resource playing entity, the multimedia resources from the resource storage entity according to the storage address of the multimedia resources, and playing the multimedia resources.

An AS, as an AS registered by a third party standing for a calling terminal in a CLIP service, includes:
a multimedia resource notification module, for obtaining a storage address of multimedia resources subscribed by the calling terminal and sending the storage address of the multimedia resources to a resource playing entity after receiving formal session information sent by the calling terminal.

A user terminal, as a called terminal in a CLIP service, includes:
a multimedia resource downloading module, for downloading multimedia resources from a resource storage entity after receiving a storage address of the multimedia resources subscribed by a calling terminal, wherein the storage address of the multimedia resources is sent by a CLIP service management entity;
a multimedia resource playing module, for playing the multimedia resources before a called user is off-hook, and stopping playing the multimedia resources after detecting that the called user is off-hook.

An MRF includes:
a multimedia resource downloading module, for downloading multimedia resources subscribed by a calling terminal from a resource storage entity after receiving a storage address of the multimedia resources, wherein the storage address of the multimedia resources is sent by a CLIP service management entity;
a multimedia resource playing module, for exchanging multimedia session information with a called terminal, establishing a media channel for playing the multimedia resources between the multimedia resource playing module and the called terminal, playing the multimedia resources for the called terminal through the media channel, and stopping playing the multimedia resources after receiving an off-hook event of the called user sent by the CLIP service management entity.

As can be seen from the above mentioned technical scheme, the multimedia resources subscribed by the calling terminal is stored in the resource storage entity accessed by the resource playing entity with the capability of downloading and playing the multimedia resources. When the calling terminal calls the called terminal, the CLIP service management entity sends the storage address of the multimedia resources to the resource playing entity, the resource playing entity then downloads the multimedia resources from the resource storage entity, and plays the multimedia resources for the called terminal when it is needed to play a ringing prompt for the called terminal according to the calling procedure. Therefore, the embodiments of the present invention enable the calling terminal to subscribe to the multimedia resources for the called terminal.

DETAILED DESCRIPTION OF THE INVENTION

The present invention will be hereinafter described in detail with reference to the accompanying drawings and embodiments. It should be understood that the described specific embodiments are only used for illustrating the present invention and not for limiting the present invention.

Embodiments of the present invention include: storing multimedia resources subscribed by a calling terminal in a resource storage entity that may be accessed by a resource playing entity with the capability of downloading and playing the multimedia resources; when the calling terminal calls a called terminal, a CLIP service management entity sending a storage address of the multimedia resources to the resource playing entity, the resource playing entity then downloading the multimedia resources from the resource storage entity and playing the multimedia resources for the called terminal.

Figure 1:
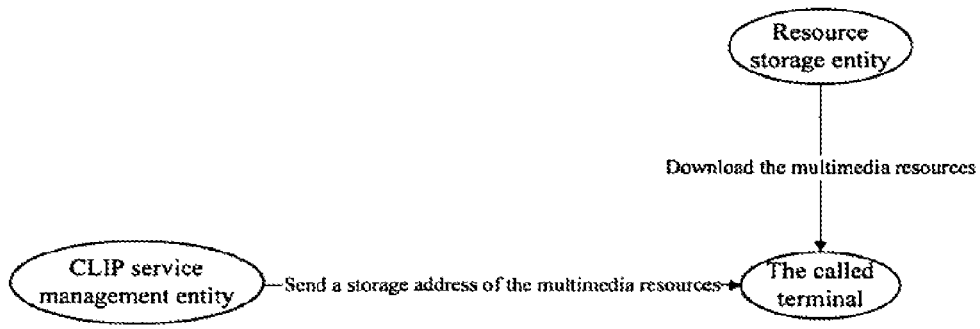
FIG. 1 is a schematic diagram illustrating a networking structure of an exemplary system for implementing a CLIP service according to an embodiment of the present invention.

FIG. 1 is a schematic diagram illustrating a networking structure of an exemplary system for implementing a CLIP service according to an embodiment of the present invention. In the exemplary system of FIG. 1, the called terminal is taken as the resource playing entity. In this embodiment, the called terminal is required to be capable of downloading and playing multimedia resources.

After the calling terminal subscribes to a CLIP service, multimedia resources subscribed by the calling terminal are stored in a resource storage entity that may be accessed by the called terminal, and a CLIP service management entity may obtain, in real time, the storage address of the multimedia resources.

The CLIP service management entity is used for, when the calling terminal calls the called terminal, sending the storage address of the multimedia resources to the called terminal.

The called terminal is used for downloading the multimedia resources from the resource storage entity and, when it is needed to play a ringing prompt for the called terminal according to the calling procedure, playing the multimedia resources.

Figure 2:
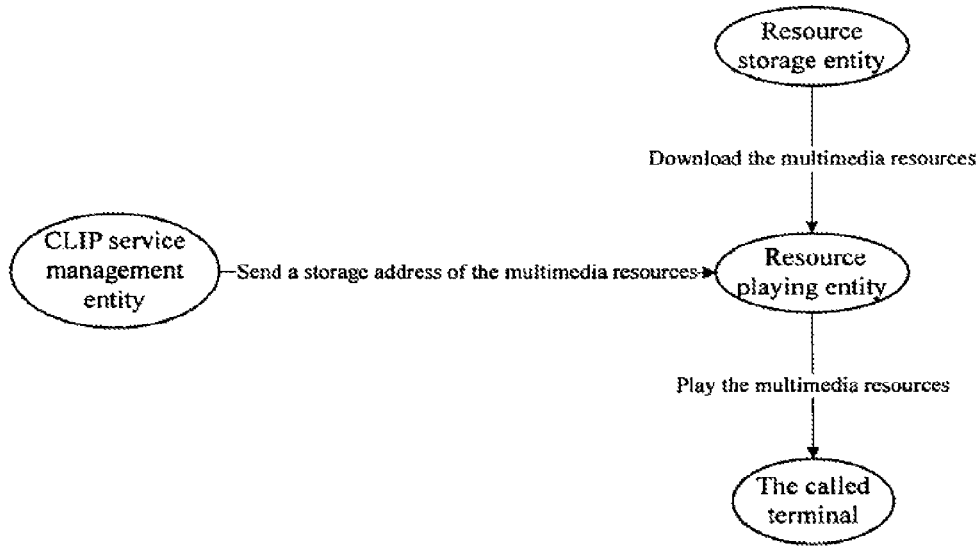
FIG. 2 is a schematic diagram illustrating a networking structure of another exemplary system for implementing a CLIP service according to an embodiment of the present invention.

FIG. 2 is a schematic diagram illustrating a networking structure of another exemplary system for implementing a CLIP service according to an embodiment of the present invention. In the exemplary system of FIG. 2, an entity except the called terminal is taken as the resource playing entity with the capability of downloading and playing multimedia resources. In this embodiment, the called terminal is not required to be capable of downloading and playing the multimedia resources.

After the calling terminal subscribes to a CLIP service, multimedia resources subscribed by the calling terminal is stored in a resource storage entity that may be accessed by the resource playing entity, and a CLIP service management entity may obtain, in real time, the storage address of the multimedia resources.

The CLIP service management entity is used for, when the calling terminal calls the called terminal, sending the storage address of the multimedia resources to the resource playing entity, establishing a media channel for playing the multimedia resources between the resource playing entity and the called terminal by forwarding multimedia session information exchanged between the resource playing entity and the called terminal, and instructing the resource playing entity to stop playing the multimedia resources for the called terminal after receiving an off-hook event of the called user.

The resource playing entity is used for downloading the multimedia resources from the resource storage entity and, when it is needed to play a ringing prompt for the called terminal according to the calling procedure, playing the multimedia resources for the called terminal. In different networks, different network entities may be taken as the resource playing entity, for example in an IMS framework, a Multimedia Resource Function (MRF) may be taken as the resource playing entity.

In the following embodiments, an example of implementing a CLIP service in an IMS framework is taken so as to describe the implementation of the CLIP service.

In the IMS network, services are usually provided by an Application Server (AS), so the AS is taken as a CLIP service management entity in the following embodiments. Preferably, the AS registered by a third party standing for the calling terminal is taken as the CLIP service management entity. The AS registered by the third party standing for the calling terminal means such AS that is registered by the third party, generally a Serving Call Server Management Function (S-CSCF) standing for the calling terminal.

The First Embodiment

This embodiment adopts the principle of the first exemplary system for implementing a CLIP service, in other words, the called terminal in this embodiment is capable of downloading and playing multimedia resources.

In this embodiment, the multimedia resources subscribed by the calling terminal is stored in a resource storage entity that may be addressed through a Uniform Resource Locator (URL) address in the IMS network, and an AS that may obtain, in real time, the URL address of the multimedia resources is taken as the CLIP service management entity. Specifically, the URL address of the multimedia resources may be stored in the AS or in such data center as a Home Subscriber Server (HSS) that the AS may access and obtain data from.

Figure 3A:
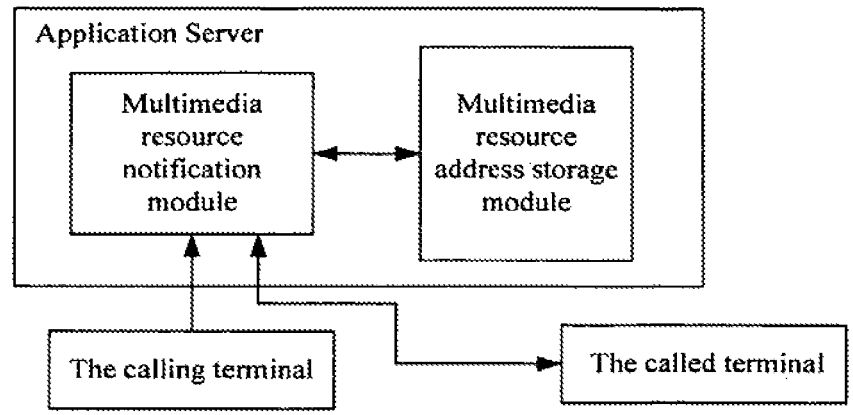
FIG. 3a is a schematic diagram illustrating a structure of the AS according to an embodiment of the present invention.

FIG. 3a is a schematic diagram illustrating a structure of the AS in this embodiment. As shown in FIG. 3a, the AS in this embodiment includes:

a multimedia resource notification module, for obtaining a storage address of the multimedia resources and sending the storage address of the multimedia resources to the called terminal after receiving formal session information sent by the calling terminal.

Optionally, the AS further includes: a multimedia resource address storage module, for storing the storage address of the multimedia resources.

Figure 3B:
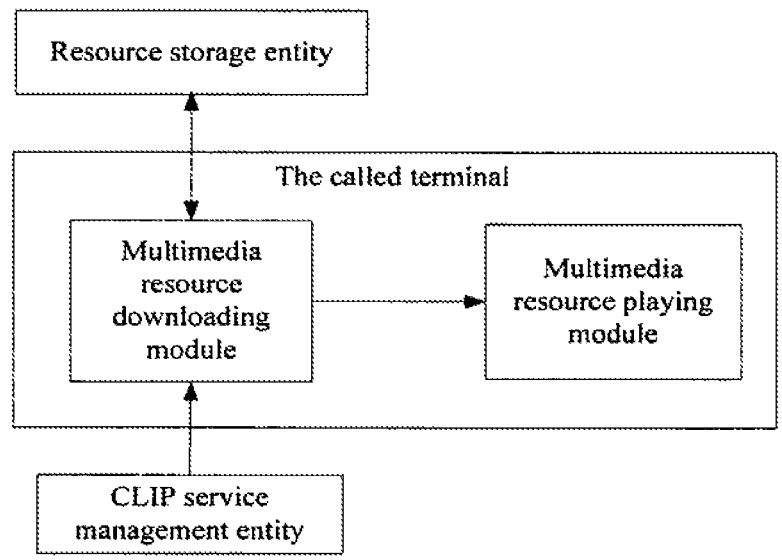
FIG. 3b is a schematic diagram illustrating a structure of the called terminal according to an embodiment of the present invention.

FIG. 3b is a schematic diagram illustrating a structure of the called terminal taken as the resource playing entity. As shown in FIG. 3b, in this embodiment, the called terminal includes:

a multimedia resource downloading module, used for downloading the multimedia resources from a resource storage entity after receiving the storage address of the multimedia resources that is sent by the AS;

a multimedia resource playing module, used for playing the multimedia resources before the called user is off-hook, and stopping playing the multimedia resources after detecting that the user is off-hook.

Figure 3C:
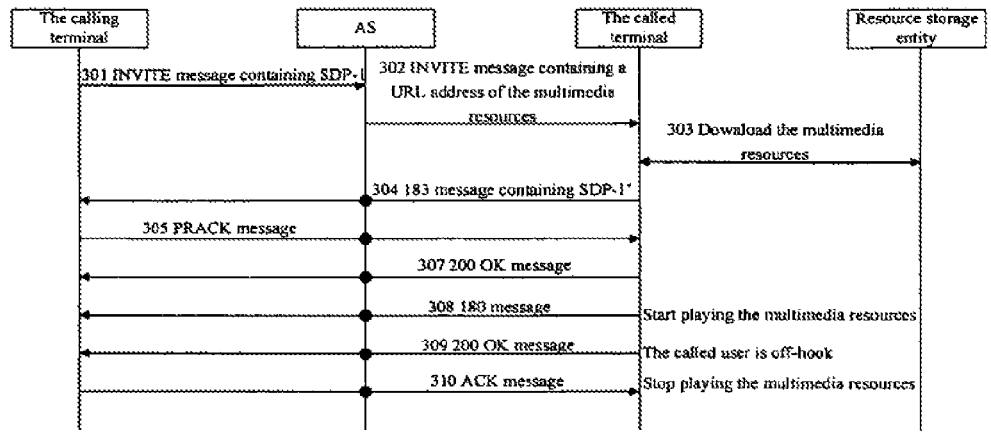
FIG. 3c is a flowchart illustrating an implementation of the CLIP service in an IMS according to an embodiment of the present invention.

FIG. 3c is a flowchart illustrating an implementation of the CLIP service in an IMS in this embodiment. The method for implementing a CLIP service in the IMS in this embodiment includes the following steps.

Step 301: the calling terminal that has subscribed to multimedia resources sends to the AS an INVITE message containing a Session Description Protocol (SDP) message body describing formal session information. Hereinafter, the SDP message body describing the formal session information is identified as SDP-1.

Step 302: the AS obtains a URL address of the multimedia resources, adds the URL address to the INVITE message, and sends the INVITE message to the called terminal. Specifically, the URL address may be added to a Call-Info header or other optional fields like Alert-Info of the INVITE message, or to an extensible Mark Language (XML) script.

The AS may obtain the URL address of the multimedia resources from URL address records of multimedia resources stored locally or from a data center for storing the URL addresses of multimedia resources, e.g., an HSS.

Step 303: the called terminal downloads the multimedia resources from the resource storage entity according to the URL address in the INVITE message. Therein, corresponding downloading modes may be adopted respectively according to different URL address formats, for example Hypertext Transfer Protocol (HTTP) or File Transfer Protocol (FTP).

Steps 304 to 307: the called terminal returns a 183 message indicating the session progress to the calling terminal through the AS, and the 183 message contains an SDP message body SDP-1' that is used for responding to the SDP-1 by the called terminal and used for describing negotiated formal session information. The calling terminal sends a Provisional Acknowledgement (PRACK) message in response to the 183 message to the called terminal through the AS, and then the called terminal returns a 200 OK message in response to the PRACK message to the calling terminal through the AS.

Step 308: the called terminal starts playing the multimedia resources and sends a 180 message indicating the ringing of the called terminal to the calling terminal through the AS. The called terminal may start playing the multimedia resources before sending the 180 message or send the 180 message before starting playing the multimedia resources, and there is no strict execution order.

Steps 309 to 310: when the called user is off-hook, the called terminal sends a 200 OK message indicating the off-hook of the called user to the calling terminal through the AS. The calling terminal, through the AS, returns an Acknowledgement (ACK) message in response to the 200 OK message sent by the called terminal to the called terminal, and then the called terminal stops playing the multimedia resources.

Thus far, the CLIP service terminates and a media channel for the formal session between the calling terminal and the called terminal has been established completely.

The Second Embodiment

This embodiment adopts the principle of the second exemplary system for implementing a CLIP service, that is, except the called terminal, an entity with the capability of downloading and playing the multimedia resources in the IMS network is taken as the resource playing entity. Generally, an MRF is taken as the resource playing entity in the IMS. The MRF may play the multimedia resources for the called terminal by a Real-time Transfer Protocol (RTP) media stream mode. Accordingly, the multimedia resources in this embodiment may be played by the RTP media stream mode.

In this embodiment, the multimedia resources subscribed by the calling terminal is stored in a resource storage entity in the IMS that may be addressed through a URL address, and the AS which may obtain, in real-time, the URL address of the multimedia resources is taken as a CLIP service management entity. Specifically, the URL address of the multimedia resources may be stored in the AS or in a data center which may be accessed by the AS, such as an HSS.

Figure 4A:
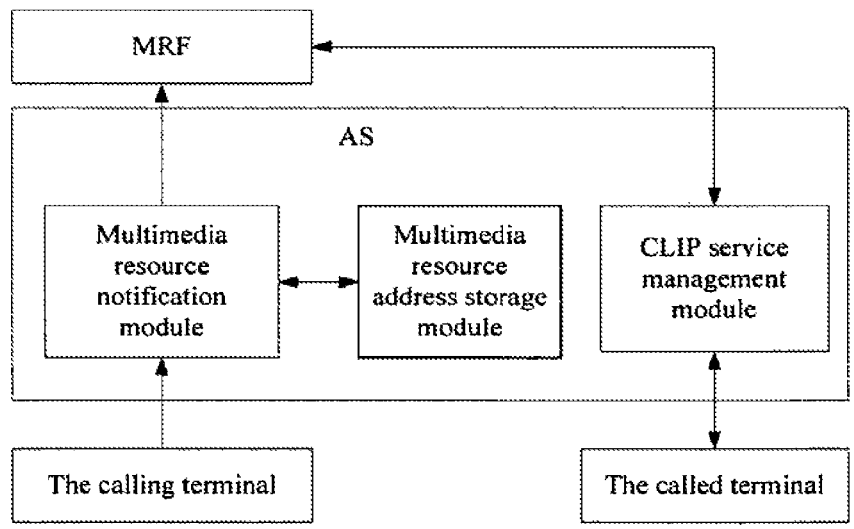
FIG. 4a is a schematic diagram illustrating a structure of the AS according to an embodiment of the present invention.

FIG. 4a is a schematic diagram illustrating a structure of the AS in this embodiment. In this embodiment, the AS includes:

a multimedia resource notification module, used for obtaining a storage address of the multimedia resources and sending the storage address to an MRF after receiving formal session information sent by the calling terminal;

a CLIP service management module, used for establishing a media channel for playing the multimedia resources between the MRF and the called terminal by forwarding multimedia session information exchanged between the MRF and the called terminal, and instructing the MRF to stop playing the multimedia resources for the called terminal after receiving an off-hook event of the called user.

Optionally, the AS further includes a multimedia resource address storage module, which is used for storing the storage address of the multimedia resources.

Figure 4B:
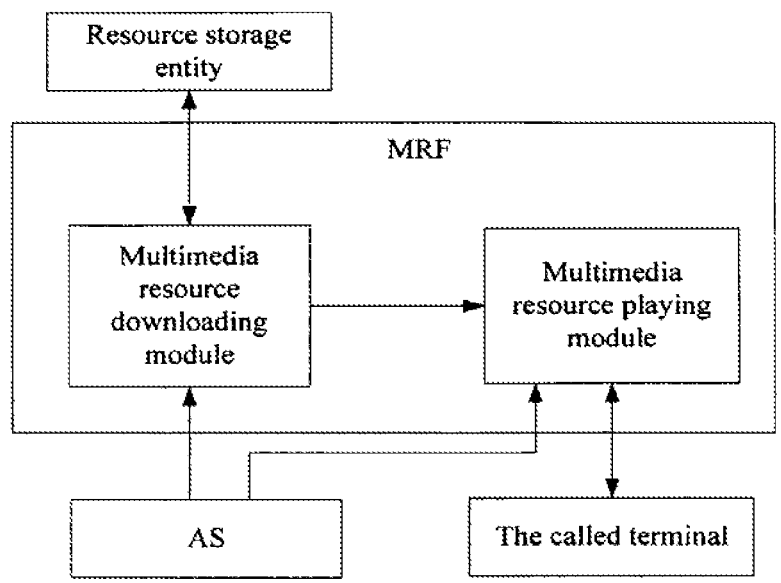
FIG. 4b is a schematic diagram illustrating a structure of the MRF in an embodiment of the present invention.

FIG. 4b is a schematic diagram illustrating a structure of the MRF in this embodiment. As shown in FIG. 4b, in this embodiment, the MRF includes:

a multimedia resource downloading module, used for downloading the multimedia resources from a resource storage entity after receiving the storage address of the multimedia resources that is sent by the AS;

a multimedia resource playing module, used for exchanging the multimedia session information with the called terminal, establishing a media channel for playing the multimedia resources between the multimedia resource playing module and the called terminal, playing the multimedia resources for the called terminal through the media channel, and stopping playing the multimedia resources for the called terminal after receiving an off-hook event of the called user sent by the AS.

Figure 4C:
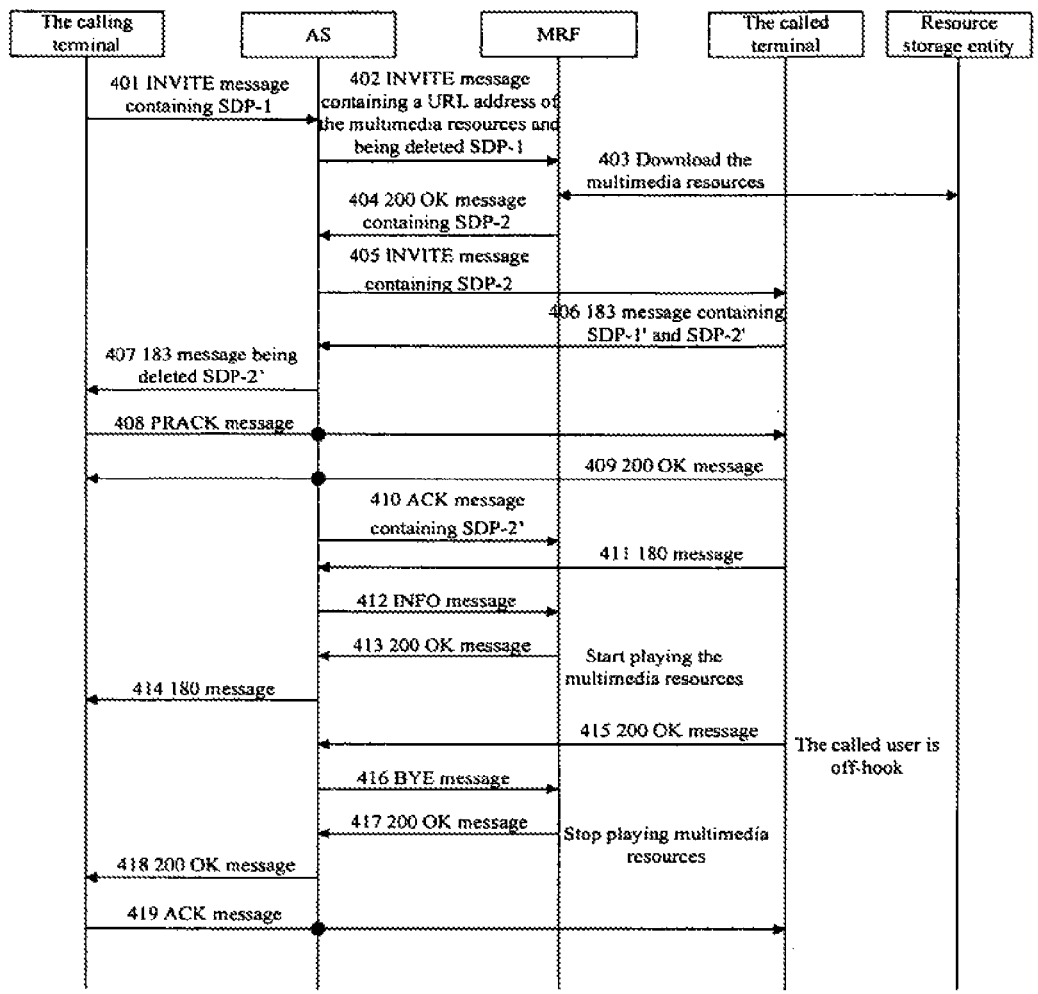
FIG. 4c is a flowchart illustrating an implementation of the CLIP service in an IMS according to an embodiment of the present invention.

FIG. 4c is a flowchart illustrating an implementation of the CLIP service in an IMS in this embodiment. As shown in FIG. 4, the implementation of a CLIP service in the IMS includes the following steps.

Step 401: the calling terminal that has subscribed to multimedia resources sends to the AS an INVITE message containing an SDP message body describing formal session information. Hereinafter, the SDP message body describing the formal session information is identified as SDP-1.

Step 402: the AS deletes the SDP-1 from the INVITE message, adds a URL address of the multimedia resources to the INVITE message and then sends the INVITE message to the MRF. Specifically, the URL address may be added to a Call-Info header or other optional fields like Alert-Info of the INVITE message, or to an XML script.

Step 403: the MRF downloads the multimedia resources from the resource storage entity according to the URL address in the INVITE message. Corresponding downloading modes may be adopted respectively, such as HTT or FTP, according to different URL address formats.

Step 404: the MRF returns to the AS a 200 OK message containing the SDP message body describing session information of the MRF playing the multimedia resources for the called terminal. The session of the MRF playing the multimedia resources for the called terminal is called a multimedia session for short hereinafter, and the SDP message body describing the session information of the MRF playing the multimedia resources is identified as SDP-2 in this embodiment.

Step 405: the AS adds the SDP-2 to the INVITE message sent by the calling terminal and sends the INVITE message to the called terminal. The INVITE message sent by the AS to the called terminal contains both the SDP-1 and the SDP-2.

Step 406: the called terminal returns to the AS a 183 message containing an SDP message body SDP-1' for responding to the SDP-1 by the called terminal and an SDP message body SDP-2' for responding to the SDP-2 by the called terminal. Specifically, the SDP-1' is used for describing negotiated formal session information, while the SDP-2' is used for describing negotiated multimedia session information.

Steps 407 to 409: the AS deletes the SDP-2' from the 183 message and returns the 183 message to the calling terminal. The calling terminal sends a PRACK message in response to the 183 message to the called terminal through the AS, and the called terminal returns a 200 OK message in response to the PRACK message to the calling terminal through the AS.

Step 410: the AS returns the ACK message containing the SDP-2' to the MRF.

Thus far, a media channel for the multimedia session between the MRF and the called terminal has been established completely.

Steps 411 to 414: the called terminal sends a 180 message to the AS, the AS sends to the MRF an INFO message instructing the MRF to start playing the multimedia resources, the MRF returns a 200 OK message in response to the INFO message to the AS and starts playing the multimedia resources for the called terminal through the media channel between the MRF and the called terminal, and then the AS forwards the 180 message to the calling terminal.

Steps 415 to 417: when the called user is off-hook, the called terminal sends to the AS a 200 OK message indicating the off-hook of the called user. The AS sends to the MRF a BYE message instructing the MRF to stop playing the multimedia resources, the MRF stops playing the multimedia resources for the called terminal through the media channel between the MRF and the called terminal, and then returns a 200 OK message in response to the BYE message to the AS.

Thus far, the CLIP service terminates.

Steps 418 to 419: the AS forwards to the calling terminal the 200 OK message indicating the off-hook of the called user. The calling terminal returns to the called terminal an ACK message for responding the 200 OK message sent by the calling terminal through the AS.

Hereby, a media channel for the formal session between the calling terminal and the called terminal has been established completely.

It should be noted that, the CLIP service is a kind of calling subscription service, and the calling user may either subscribe to or cancel the CLIP service. If the calling user has subscribed to the CLIP service, the multimedia resources may be used during the calling procedure; otherwise, such CLIP service may not be used. The called terminal may determine whether to accept the multimedia resources subscribed by the calling terminal as required. For example, the called user may determine to display the multimedia resources by subscribing to a multimedia resource display service. If the called user has subscribed to the multimedia resource display service, the multimedia resources will be displayed; otherwise, the multimedia resources will not be displayed. The called user may determine not to display the multimedia resources by subscribing to a multimedia resource display restriction service. If the called user has subscribed to the multimedia resource display restriction service, the multimedia resources will not be displayed; otherwise, the multimedia resources will be displayed.

The Third Embodiment

The present embodiment also adopts the principle of the second exemplary system for implementing a CLIP service. The main difference from the second embodiment lies in: the second embodiment adopts an earlier media scheme of an application server model, namely using two SDP message bodies, one SDP message body is used for describing the formal session information, while the other SDP message body is used for describing the multimedia session information. Embodiments of the present invention adopt an earlier media scheme of a gateway model, namely that one SDP message body is used for describing both the formal session information and the multimedia session information, that is, one part of the SDP message body is used for describing the formal session information and the other part is used for describing the multimedia session information.

The AS and the MRF in this embodiment have the same structures as the AS in FIG. 4a and the MRF in FIG. 4b respectively, so no more description is made in detail.

Figure 5:
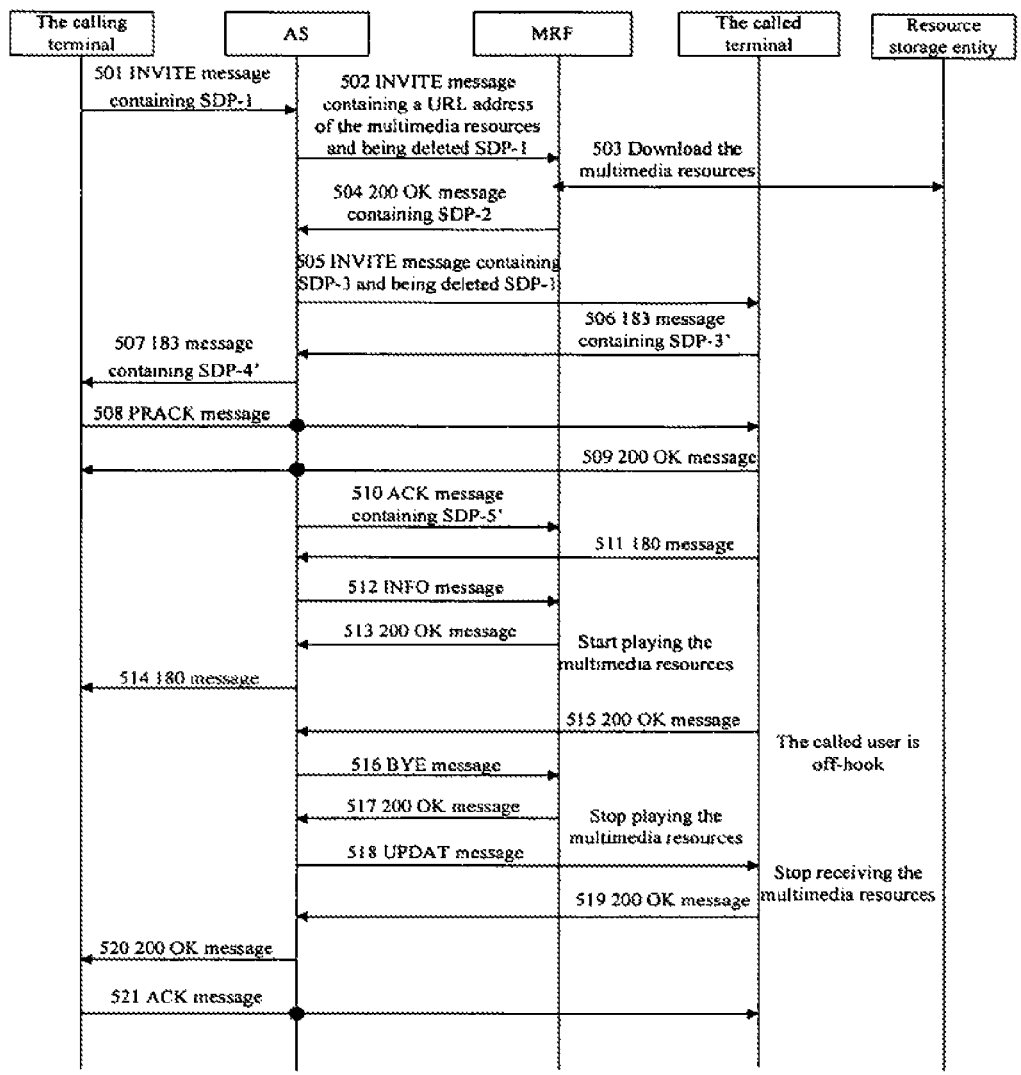
FIG. 5 is a flowchart illustrating an implementation of the CLIP service in an IMS according to an embodiment of the present invention.

FIG. 5 is a flowchart illustrating an implementation of the CLIP service in an IMS in this embodiment. As shown in FIG. 5, the implementation of a CLIP service in the IMS includes the following steps.

Step 501: the calling terminal that has subscribed to multimedia resources sends to the AS an INVITE message containing an SDP message body describing formal session information. Hereinafter, the SDP message body describing the formal session information is identified as SDP-1.

Step 502: the AS deletes the SDP-1 from the INVITE message, adds a URL address of the multimedia resources to the INVITE message and then sends the INVITE message to the MRF. Specifically, the URL address may be added to a Call-Info header or other optional fields like Alert-Info of the INVITE message, or to an XML script.

Step 503: the called terminal downloads the multimedia resources from a resource storage entity according to the URL address in the INVITE message. Corresponding downloading modes may be adopted respectively, such as HTTP or FTP, according to different URL address formats.

Step 504: the MRF returns to the AS a 200 OK message containing an SDP message body describing the multimedia session information. The SDP message body describing the multimedia session information is identified as SDP-2.

Step 505: the AS constructs an SDP message body describing both the formal session information and the multimedia session information, and the SDP message body newly constructed is called SDP-3 for short hereinafter. The AS deletes the SDP-1 from the INVITE message sent by the calling terminal, adds the SDP-3 to the INVITE message and then sends the INVITE message to the called terminal.

Step 506: the called terminal returns to the AS a 183 message containing an SDP message body SDP-3' for responding to the SDP-3 by the called terminal, in other words, the SDP-3' is used for describing both negotiated formal session information and negotiated multimedia session information simultaneously.

Step 507: the AS deletes the part describing the negotiated multimedia session information from the SDP-3', hereinafter, the SDP-3' that has gone through the deleting process is identified as SDP-4'. The AS sends a 183 message containing the SDP-4' to the calling terminal. The SDP-4' only describes the negotiated formal session information.

Steps 508 to 509: the calling terminal sends to the called terminal a PRACK message in response to the 183 message sent by the AS through the AS, and then the called terminal returns to the calling terminal a 200 OK message in response to the PRACK message through the AS.

Step 510: the AS deletes the part describing the negotiated formal session information from the SDP-3'. Hereinafter, the SDP-3' that has gone through the deleting process is identified as SDP-5'. The AS sends to the MRF an ACK message containing the SDP-5'. The SDP-5' only describes the negotiated multimedia session information.

Thus far, the media channel for the multimedia session between the MRF and the called terminal has been established completely.

Steps 511 to 514: the called terminal sends a 180 message to the AS, the AS sends to the MRF an INFO message instructing the MRF to start playing the multimedia resources, the MRF returns a 200 OK message in response to the INFO message to the AS and starts playing the multimedia resources for the called terminal through the media channel between the MRF and the called terminal, and then the AS forwards the 180 message to the calling terminal.

Steps 515 to 517: when the called user is off-hook, the called terminal sends to the AS a 200 OK message indicting the off-hook of the called user. The AS sends to the MRF a BYE message instructing the MRF to stop playing the multimedia resources. The MRF stops playing multimedia resources for the called terminal through the media channel between the MRF and the called terminal, and then returns a 200 OK message in response to the BYE message to the AS.

Thus far, the CLIP service terminates.

Steps 518 to 521: the AS sends to the called terminal a UPDATE message for notifying the called terminal to modify the attribute of the multimedia session information part in the SDP-3' into deactivation, by which the called terminal may stop receiving the multimedia resources. The called terminal modifies the attribute of the multimedia session information part in the SDP-3' into the deactivation, stops receiving the multimedia resources and returns a 200 OK message in response to the UPDATE message to the AS.

The AS forwards the 200 OK message indicating the off-hook of the called user to the calling terminal, and then the calling terminal returns an ACK message in response to the 200 OK message to the called terminal through the AS.

Hereby, the media channel for the formal session between the calling terminal and called terminal has been established completely.

The foregoing description is only a preferred embodiment of this invention and is not for use in limiting the protection scope thereof. All the modifications, equivalent replacements or improvements in the scope of the present invention's sprit and principles shall be included in the protection scope of the present invention.

The invention claimed is:

1. An apparatus that is configured as a Multimedia Calling Line Identification (CLIP) service, the apparatus including one or more processors and one or more non-transitory computer readable media having stored thereon computer-executable instructions that are executable by the one or more processors to configure the apparatus to perform at least the following:

receive a request from a calling terminal device that is subscribed to a multimedia resource, the request for the calling terminal device to initiate a session between the calling terminal device and a called terminal device, wherein the request includes a Session Description Protocol (SDP) message body;

based on the request, obtain a storage address of the multimedia resource to which the calling terminal device is subscribed;

send the storage address of the multimedia resource to the called terminal device; and based on sending the storage address of the multimedia resource to the called terminal device:

receive, from the called terminal device, a first message indicating ringing of the called terminal device, ringing of the called terminal device comprising the called terminal device playing the multimedia resource;

receive, from the called terminal device, a second message indicating that the called terminal device is off-hook;

forward, to calling terminal device, the second message indicating that the called terminal device is off-hook;

receive, from the calling terminal, a third message acknowledging that the called terminal device is off-hook; and forward, to the called terminal device, the third message acknowledging that the called terminal device is off-hook, wherein the called terminal device stops playing the multimedia resource based on receipt of the third message.

2. The apparatus of claim 1, wherein the request comprises an INVITE message containing the SDP message body.

3. The apparatus of claim 2, wherein sending the storage address of the multimedia resource to the called terminal device comprises modifying the INVITE message, including adding a Uniform Resource Locator (URL) address to the INVITE message, and sending the modified INVITE message to the called terminal device.

4. The apparatus of claim 3, wherein adding the URL address to the INVITE message comprises adding the URL address to one or more of a Call-Info field, an Alert-Info field, or an eXtensible Markup Language (XML) script.

5. The apparatus of claim 2, wherein the INVITE message describes formal session information.

6. The apparatus of claim 1, the computer-executable instructions also being executable to configure the apparatus, subsequent to sending the storage address of the multimedia resource to the called terminal device, and prior to receiving the first message, to:
- receive, from the called terminal device, a fourth message indicating session progress; and
- forward, to the calling terminal device, the fourth message indicating session progress.

7. The apparatus of claim 1, the computer-executable instructions also being executable to configure the apparatus to forward, to the calling terminal device, the first message indicating ringing of the called terminal device.

8. A method, comprising:
- receiving a request from a calling terminal device that is subscribed to a multimedia resource, the request for the calling terminal device to initiate a session between the calling terminal device and a called terminal device, wherein the request includes a Session Description Protocol (SDP) message body;
- based on the request, obtaining a storage address of the multimedia resource to which the calling terminal device is subscribed;
- sending the storage address of the multimedia resource to the called terminal device; and
- based on sending the storage address of the multimedia resource to the called terminal device:
  - receiving, from the called terminal device, a first message indicating ringing of the called terminal device, ringing of the called terminal device comprising the called terminal device playing the multimedia resource;
  - receiving, from the called terminal device, a second message indicating that the called terminal device is off-hook;
  - forwarding, to calling terminal device, the second message indicating that the called terminal device is off-hook;
  - receiving, from the calling terminal, a third message acknowledging that the called terminal device is off-hook; and
  - forwarding, to the called terminal device, the third message acknowledging that the called terminal device is off-hook, wherein the called terminal device stops playing the multimedia resource based on receipt of the third message.

9. The method of claim 8, wherein the request comprises an INVITE message containing the SDP message body.

10. The method of claim 9, wherein sending the storage address of the multimedia resource to the called terminal device comprises modifying the INVITE message, including adding a Uniform Resource Locator (URL) address to the INVITE message, and sending the modified INVITE message to the called terminal device.

11. The method of claim 10, wherein adding the URL address to the INVITE message comprises adding the URL address to one or more of a Call-Info field, an Alert-Info field, or an eXtensible Markup Language (XML) script.

12. The method of claim 8, further comprising, subsequent to sending the storage address of the multimedia resource to the called terminal device, and prior to receiving the first message:
- receiving, from the called terminal device, a fourth message indicating session progress; and
- forwarding, to the calling terminal device, the fourth message indicating session progress.

13. The method of claim 8, further comprising forwarding, to the calling terminal device, the first message indicating ringing of the called terminal device.

14. The method of claim 9, wherein the INVITE message describes formal session information.

15. An apparatus that is configured as a user terminal device, the apparatus including one or more processors and one or more non-transitory computer readable media having stored thereon computer-executable instructions that are executable by the one or more processors to configure the apparatus to perform at least the following:
- receive, from a Multimedia Calling Line Identification (CLIP) service management entity, a message including a Session Description Protocol (SDP) message body, the message comprising a storage address of a multimedia resource to which a calling terminal device is subscribed, the storage address of the multimedia resource having been sent by the CLIP service management entity to the user terminal device upon the CLIP service management entity receiving a request from the calling terminal device to initiate a session between the calling terminal device and the user terminal device; and
- download the multimedia resource from a resource storage entity using the storage address of the multimedia resource;
- play the multimedia resource at the user terminal device after the multimedia resource downloading module downloads the multimedia resource as part of ringing of the user terminal device;
- send, through the CLIP service management entity, a first message to the calling terminal device indicating ringing of the user terminal device;
- subsequent to sending the first message, detect that the user terminal device is off-hook;
- based on detecting that the user terminal device is off-hook, send, through the CLIP service management entity, a second message to the calling terminal device indicating that the user terminal device is off-hook;
- receive, through the CLIP service management entity, a third message from the calling terminal device acknowledging that the user terminal device is off-hook; and
- based on receiving the third message, cease playing the multimedia resource at the user terminal device.

16. The apparatus of claim 15, the computer-executable instructions also being executable to configure the apparatus to perform at least the following:
- return a message towards the calling terminal device indicating session progress;
- receive an acknowledge message from the calling terminal device; and
- return an okay message towards the calling terminal device.

17. The apparatus of claim 16, wherein each message contains a Session Description Protocol (SDP) message body.

18. The apparatus of claim 16, wherein each message is routed through the CLIP service management entity.

19. The apparatus of claim 15, the computer-executable instructions also being executable to configure the apparatus, subsequent to receiving the storage address of the multimedia resource, and prior to sending the first message, to send, through the CLIP service management entity, a fourth message to the calling terminal indicating session progress.

* * * * *